(12) United States Patent
Herrmann et al.

(10) Patent No.: US 8,760,406 B2
(45) Date of Patent: Jun. 24, 2014

(54) EDGE TO EDGE QWERTY KEYPAD FOR A HANDHELD DEVICE

(75) Inventors: Andrew B. Herrmann, Libertyville, IL (US); David G. Fliszar, Gurnee, IL (US); Michael J. Formenti, Channahon, IL (US); Roger W. Harmon, Crystal Lake, IL (US); Thomas A. Petrella, Walworth, WI (US)

(73) Assignee: Motorola Mobility LLC, Chicago, IL (US)

( * ) Notice: Subject to any disclaimer, the term of this patent is extended or adjusted under 35 U.S.C. 154(b) by 165 days.

(21) Appl. No.: 13/437,957

(22) Filed: Apr. 3, 2012

(65) Prior Publication Data

US 2013/0257726 A1    Oct. 3, 2013

(51) Int. Cl.
*G06F 3/02* (2006.01)

(52) U.S. Cl.
USPC ........... 345/169; 345/160; 345/168; 345/170; 345/172; 200/302.2; 361/679.3; 361/679.56; 341/22; 455/566

(58) Field of Classification Search
USPC .............. 345/156, 160, 168–172; 361/679.3, 361/679.56; 200/302.2, 341; 341/22; 455/566
See application file for complete search history.

(56) References Cited

U.S. PATENT DOCUMENTS

| | | | |
|---|---|---|---|
| 6,153,843 A | | 11/2000 | Date et al. |
| 6,630,925 B1 * | | 10/2003 | Ostergård et al. ............. 345/168 |
| 6,670,893 B1 * | | 12/2003 | Svarfvar ......................... 341/22 |
| 6,919,824 B2 * | | 7/2005 | Lee ................................... 341/20 |
| 7,016,704 B2 * | | 3/2006 | Pallakoff ......................... 455/566 |
| 7,546,152 B2 * | | 6/2009 | Christensen ............... 455/575.3 |
| 7,625,286 B2 | | 12/2009 | Hamada |
| 7,667,371 B2 * | | 2/2010 | Sadler et al. ................... 310/317 |
| 7,910,851 B2 * | | 3/2011 | Janninck et al. ............... 200/516 |
| 2003/0081767 A1 | | 5/2003 | Montague |
| 2008/0150767 A1 | | 6/2008 | Lawton et al. |
| 2009/0145736 A1 * | | 6/2009 | Villain et al. .................. 200/341 |
| 2009/0154138 A1 | | 6/2009 | Isoda et al. |
| 2009/0178906 A1 * | | 7/2009 | Liu et al. ........................ 200/310 |
| 2010/0044198 A1 * | | 2/2010 | Tang et al. ................... 200/302.2 |
| 2010/0245267 A1 * | | 9/2010 | Min et al. ........................ 345/173 |
| 2011/0115711 A1 * | | 5/2011 | Gunawan ....................... 345/169 |
| 2011/0141028 A1 | | 6/2011 | Bedolla et al. |
| 2013/0140163 A1 * | | 6/2013 | Huang et al. ................... 200/5 A |

FOREIGN PATENT DOCUMENTS

| | | |
|---|---|---|
| CA | 2335406 A1 | 7/2002 |
| DE | 10341073 A1 | 4/2005 |
| EP | 0367204 A2 | 5/1990 |
| EP | 0509368 A2 | 10/1992 |
| EP | 1017075 A2 | 7/2000 |
| WO | 2007145423 A1 | 12/2007 |

OTHER PUBLICATIONS

Patent Cooperation Treaty, International Search Report and Written Opinion of the International Searching Authority for International Application No. PCT/US2013/030669, Oct. 2, 2013, 24 pages.

* cited by examiner

*Primary Examiner* — Lun-yi Lao
*Assistant Examiner* — Elliott Deaderick

(57) ABSTRACT

An improved handheld electronic device is provided with a display and a unique edge to edge qwerty keypad. The specially arranged qwerty keypad has special side keys and intermediate keys which cooperate with the housing to provide a waterproof casing (case) and sealing system to seal and protect the keys, backlighting, flexes, domes and printed circuit board (PCB) from water.

20 Claims, 5 Drawing Sheets

EDGE TO EDGE QWERTY KEYPAD FOR A HANDHELD DEVICE

BACKGROUND OF THE INVENTION

1. Field of the Disclosure

The disclosure relates in general to electronic devices, and more particularly, to mobile electronic devices, such as a mobile telephone, with an electronic display and a keypad.

2. Background Art

Mobile phones and other electronic devices are very useful for: telephone calls; internet usage; e-mailing; texting; downloading; photography; video conferencing; surfing and searching the world wide web; retrieving, storing and viewing information; social networking; calculating; computing; playing games, etc.

It is desirable for a qwerty keypad to extend from edge to edge for some phone form factors. This maximizes the size of the keypad and makes it as useable as possible.

Dome location, dome seal and keypad retention features on conventional cell phone do no allow the keypad to extend to the edges of the phone for qwerty keypads. While some conventional phones with bell keypads have been able to extend the keypads to the edges of the phone, such conventional phones have only three domes instead of more than 10 domes for a qwerty keypad.

Most electronic devices will fail, short out, or otherwise become ineffective or less effective, upon exposure to too much moisture, such as heavy rain, sleet, snow, or from swimming or being submerged in water, such as accidentally dropping the phone in toilets, puddles, swimming pools, basins or sinks.

Over the years various attempts have been made to seal keypads, keys, buttons and other features of electronic devices. These attempts have met with varying degrees of success. However, most conventional prior sealing designs and systems do not effectively seal and waterproof the side keys of an electronic device. There is a need to waterproof keys and switches of the mobile phones and other electronic devices into the interior of the electronic device so that the electronic device can function and operate in its intended manner when exposed to moisture.

It is, therefore, desirable to provide an improved handheld electronic device which overcomes most, if not all, of the preceding problems.

SUMMARY OF THE INVENTION

An improved handheld electronic device with an edge to edge qwerty keypad, also sometimes referred to as a QWERTY keypad, maximizes the size of the keypad and makes it as useable as possible for numerous phone form factors. The improved handheld electronic device provides a water sealing keypad system with a unique sealing design for keys and components of the electronic device which is cost-effective, attractive, and effective. The user friendly handheld electronic device is reliable, easy to use, and comfortable. It can also provide better tactile feel and touch control. The improved handheld electronic device solves the problem of water sealing the keys of a keypad in a mobile phone or other electronic device in an inexpensive manner. The improved water sealing button system can be used with any electronic device that requires a higher level of water ingress protection.

The improved handheld device provides a keypad structure that places the edge domes (side domes) on a lower level than the main keypad board or printed circuit board (PCB) and other domes. The outer side domes (edge domes) can be placed on a lower level and then actuated by a lever arm built into the outer side key (edge key) structure.

Because the outer side key (edge key) domes are moved away from the edge, the keypad can be water sealed as well as provide other features to prevent the keys from being picked off. This structure can minimize the thickness impact of the handheld electronic device. The lever arm of the outer side key allows backlight construction as well as similar tactile and good alignment of the outer side keys to the main keypad.

Portrait qwerty layout and vertical slider can benefit form the edge to edge qwerty keypad construction of the improved handheld electronic device.

The improved handheld electronic device provides a multi-button (multiple buttons) keypad arrangement, preferably for a qwerty keypad, for a mobile device in which the edge keys wrap around the sides of the mobile device and enable an edge to edge keyboard. The domes on the edge keys can be on the reverse side of the printed circuit board (PCB) compared to the internal intermediate keys on the top side. The domes for the edge keys can be on a lower surface compared to the internal intermediate keys. The actuation force of the edge keys preferably matches the actuation force of the internal intermediate keys. A light guide, such as a backlighting strip or sheet, can extend off the edges of the PCB to light under the edge keys. Multiple keys can be retained with a single metal wire to accommodate rotation or pivoting of the edge keys. Desirably, the assembly of the PCB and buttons (keys) results in a module that provides a waterproof design.

The handheld electronic device can be a mobile electronic communications device, such as: a qwerty phone, radiotelephone, a cellular (cell) phone, a mobile phone, smart phone, flip phone, slider phone, android phone, tablet phone, camera phone, clamshell device, portable networking device, wireless device, portable gaming device, mobile communications device, personal digital assistant (PDA), wireless e-mail device, a two way pager, internet communication device, android tablet, ipod, ipad, blackberry, tablet device, laptop computer, netbook, personal computer, or combinations of any of the preceding.

The handheld electronic device can comprise a mobile unit having a housing with sides and opposed surfaces. The sides can include longitudinal sides with longitudinal edges and lateral sides with lateral edges. The longitudinal sides can be longer than the lateral sides. One of the surfaces can have a keypad extending to two of the sides. The keypad can have at least 10 keys including side keys and intermediate keys positioned between the side keys. Desirably, the side keys can extend to and are substantially aligned with two of the sides. In the preferred form, the keypad can extend to the longitudinal sides. Preferably, the keypad is a qwerty keypad or a qwerty keyboard.

The side keys can comprise wrap keys which wrap or curl about at least a portion of the sides. The side keys can also comprise pivotable side keys. The side keys can extend to and abuttingly engage the longitudinal edges of the handheld electronic device.

The mobile unit can comprise a display positioned in proximity to the keypad. In the illustrated embodiment, the mobile unit is generally rectangular and moveable from a portrait mode to a landscape mode and vice versa. The keypad can be spaced longitudinally from the display and the keys can be positioned for use in the portrait mode.

The handheld electronic device can include backlighting for illuminating the side keys and the intermediate keys. The handheld electronic device can also include domed contact switches including side domed contact switches positioned inwardly of the side keys and intermediate domed contact switches positioned inwardly of the intermediate keys. The side domed contact switches can be positioned at a level further inwardly from the side keys than the intermediate domed contact switches are from the intermediate keys. The handheld electronic device can further include a conductive flex that can be positioned adjacent the domed contact switches and keys. The handheld electronic device can also include a printed circuit board (PCB) with opposite PCB surfaces including a front PCB surface and a back PCB surface. The intermediate domed contact switches can be positioned in front of the front PCB surface and the side domed contact switches can be positioned in back of the back PCB surface.

In another form, the handheld electronic device can comprise a mobile unit having a housing with sides and outer and inner surfaces. The sides can include longitudinal sides with longitudinal edges and lateral sides with lateral edges. In the illustrated embodiment, the longitudinal sides are longer than the lateral sides and the mobile unit is moveable from a portrait mode to a landscape mode and vice versa. One of the surfaces can have a display positioned in proximity to a keypad having at least 10 keys including side keys and intermediate keys positioned between the side keys. Advantageously, the keypad can extend to the longitudinal sides and the sides keys can extend to and be substantially aligned with the longitudinal edges. The handheld electronic device can comprise domed contact switches providing domes within an interior of the mobile unit. The domed contact switches can include side domed contact switches and intermediate domed switches. The side domed contact switches can be spaced laterally inwardly from the longitudinal edges. The intermediate domed switches can be positioned at an intermediate level transversely from the intermediate keys. The side domed contact switches can be positioned to a farther (deeper) level transversely from the side keys or transversely from the intermediate keys adjacent the side keys, such that the farther level of said side domed contact switches have a greater span (distance) to the keys than the span (distance) of the intermediate level of the intermediate domed contact switches to the intermediate keys.

The mobile unit can include a base, flip, slide, and/or moveable portion with a keypad-containing portion for receiving or containing a qwerty keypad, tactile keypad, light transmissive keypad, qwerty keyboard, capacitive keypad, keyboard, alpha numeric keypad, mold print keypad, or combinations of any of the preceding.

The keys can comprise: light transmissive keys, backlit keys, tactile keys, alpha numeric keys, a shift key, a command key, an enter key, space key, delete key, return key, capital letter key, tab key, buttons, capital letter key, tab key, buttons, or combinations of any of the preceding keys.

The display can comprise: a display screen, a touchscreen, a display with touch sensors, a touchpad, a capacitive touchpad, a user interface, a screen with zoom control, a screen with a magnifier, a screen with a scroll bar, a screen with a slide bar, a screen providing a browser window, a screen with an electronic mouse, a screen with a visual selector, a screen with a moveable cursor, a screen with a pointer, or combinations of any of the preceding.

The mobile unit can include a battery compartment for receiving a battery and having a battery floor. The mobile unit can also include backlighting comprising a backlighting strip powered by the battery for backlighting and illuminating the intermediate keys and the side keys. The backlighting can be spaced laterally inwardly from the longitudinal edges.

The side keys can comprise: overhanging edge keys which overhang, wrap or curl about at least a portion of one of the longitudinal, pivotable side keys, side keys with retention pins, side key with pivot pins, side keys having channel defining slots for receiving longitudinal end portions of the backlighting strip, side keys positioned on the battery floor of the battery compartment, or combinations of any of the preceding.

The side domed contact switches can be positioned at a location, such a side position transversely aligned with the side keys or an intermediate position that is transversely aligned with the intermediate keys adjacent the side keys. A conductive flex can positioned between the domed contact switches and the keys. The intermediate domed contact switches can be positioned in front of a front surface of a printed circuit board (PCB) and the side domed contact switches can positioned in back of the back surface of the PCB.

Advantageously, the side keys can cooperate with the housing to provide a waterproof casing and sealing system to seal and protect the keys and domed contact switches from water.

A more detailed explanation of the invention is provided in the following detailed descriptions and appended claims taken in conjunction with the accompanying drawings.

DETAILED DESCRIPTION OF THE INVENTION

The following is a detailed description and explanation of the preferred embodiments of the invention and best modes for practicing the invention.

Figure 1:
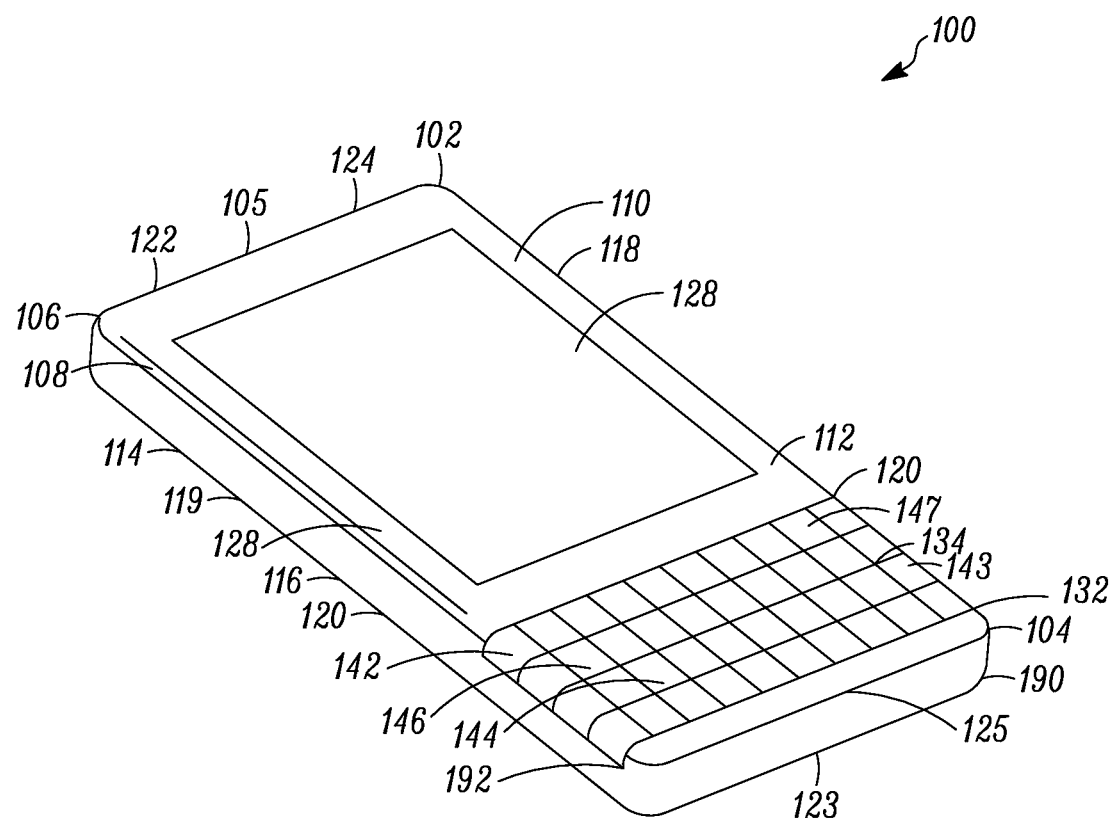
FIG. 1 is a perspective view of handheld electronic device with an edge to edge qwerty keypad in accordance with principle of the present invention.

As shown in FIG. 1, a handheld electronic device 100 comprises a mobile electronic communications device 102 which can provides a generally rectangular mobile unit 104 comprising a module 105 having a housing 106 with generally rectangular sides 108 and rounded corners 109, an outer upper surface 110 providing a top of 112 the mobile unit and an inner lower surface 114 providing a bottom 116 of the mobile unit. The sides can include substantially parallel longitudinal sides 118 and 119 with substantially parallel longitudinal edges 120 and 121 and substantially parallel lateral sides 122 and 123 with substantially parallel lateral edges 124 and 125. The longitudinal sides can have similar lengths and can be longer than the lateral sides. The longitudinal edges can have similar lengths and can be longer than the lateral edges.

The mobile electronic communications device can comprise: a radiotelephone, a cellular (cell) phone, a mobile phone, smart phone, flip phone, slider phone, android phone, tablet phone, camera phone, clamshell device, portable networking device, qwerty device, wireless device, personal digital assistant (PDA), wireless e-mail device, a two way pager, internet communications device, android tablet, ipod, ipad, blackberry, tablet device, or combinations of any of the preceding.

The mobile unit can have a display compartment 126 (FIG. 1) along the upper surface for containing, receiving and holding a generally rectangular display 128. The mobile unit and module can be moved from a portrait mode to a landscape mode and vice versa. The display can have a display floor 130 (FIG. 5) under the display. The display can comprise: a display screen, a touchscreen, a display with touch sensors, a touchpad, a capacitive touchpad, a user interface, a screen with zoom control, a screen with a magnifier, a screen with a scroll bar, a screen with a slide bar, a screen providing a browser window, a screen with an electronic mouse, a screen with a visual selector, a screen with a moveable cursor, a screen with a pointer, or combinations of any of the preceding.

Figure 2:
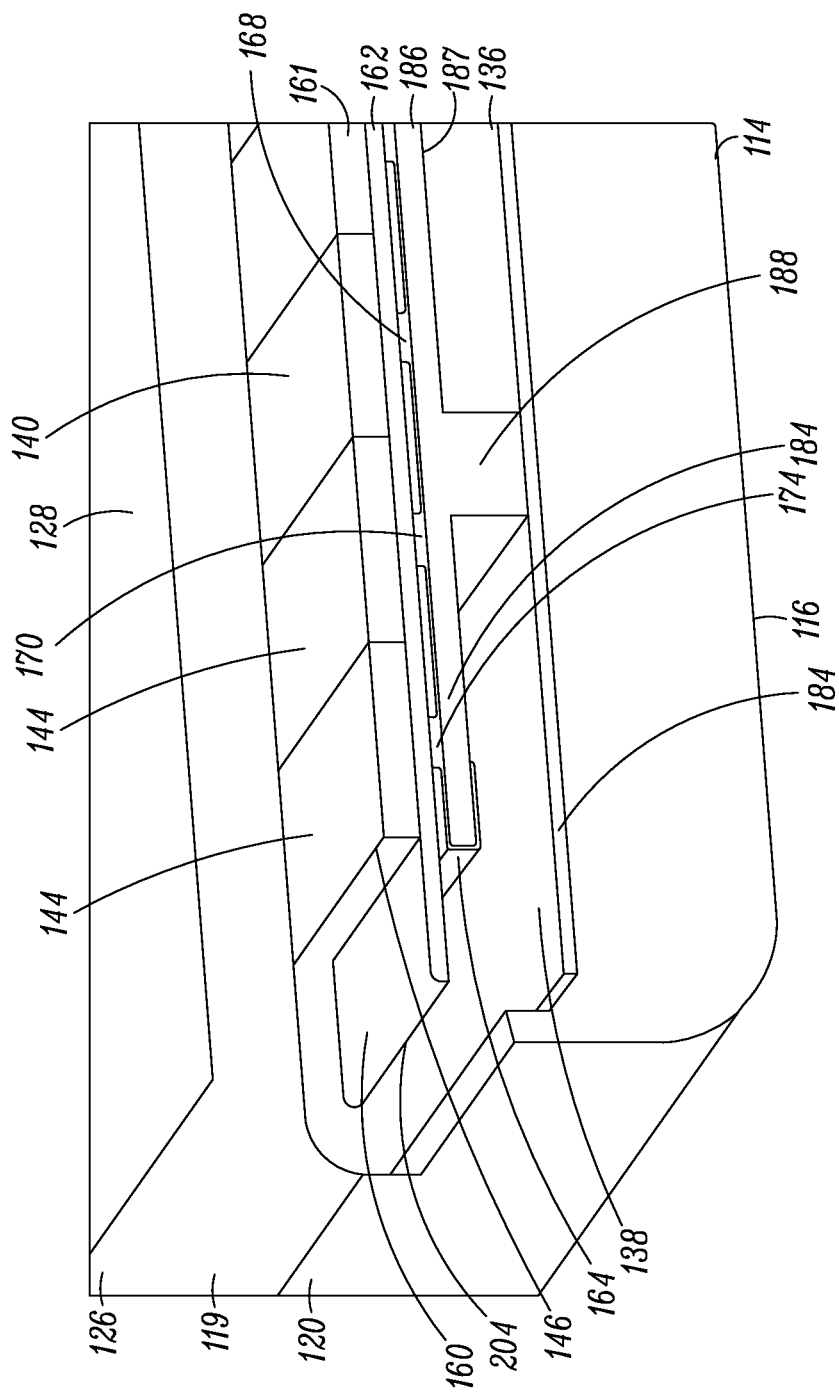
FIG. 2 is an enlarged fragmentary perspective view of some of the intermediate internal keys of the qwerty keypad, as well as portions of a backlight, intermediate flex, domes, printed circuit board (PCB) and post in the interior of the handheld electronic device.

The mobile unit can have a keypad-containing portion 132 (FIG. 1) along the upper surface for containing, receiving and holding a keypad 134, preferably an edge to edge qwerty keypad (also referred to as a QWERTY keypad). The keypad can be positioned along a lateral side in proximity to and spaced longitudinally from the display. The keypad can also comprise a qwerty keypad, tactile keypad, light transmissive keypad, qwerty keyboard, capacitive keypad, keyboard, alpha numeric keypad, mold print keypad, or combinations of any of the preceding. The mobile unit and keypad section can also comprise a battery compartment 136 (FIGS. 2 and 3) for receiving and containing a battery. The battery compartment can have a generally planar or flat battery floor 138 (FIG. 5) which can be integrally connected to and extends in coplanar alignment with a generally planar or flat display floor 140.

Figure 4:
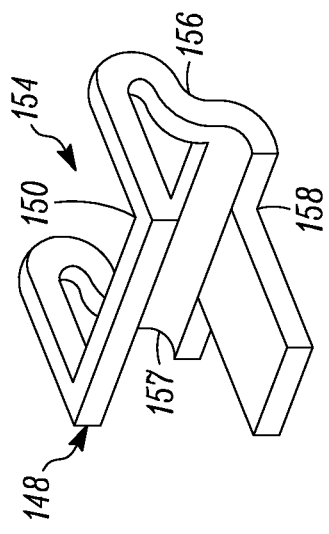
FIG. 4 is an enlarged perspective view of an overmold.

The edge to edge qwerty keypad can extend to the longitudinal edges of the longitudinal sides and have tactile finger-engageable keys 142 (FIGS. 1 and 5) that are actuated and depressed with an actuation force. The keys can include side keys 144 and intermediate keys 146 which are positioned laterally or inwardly between the side keys. The side keys, which are sometimes referred to as which are also referred to as edge keys, outer keys, overhanging pivotable edge keys or wrap keys, can extend to and be substantially vertically and longitudinally aligned with the longitudinal edges of the longitudinal sides. The side keys can be actuated and depressed by a side key-actuation force, while the intermediate keys can be actuated and depressed by an intermediate key-actuation force. Preferably, the side key-actuation force and the intermediate key-actuation force are substantially similar or equal. The keys comprise can comprise qwerty keys comprising one or more of the following: light transmissive keys, backlit keys, tactile keys, alpha numeric keys, shift key, command key, enter key, space key, delete key, return key, capital letter key, tab key, and buttons Overmolds 148 (FIG. 4) can be positioned to securely hold the side keys and can comprise stainless steel for additional strength. The overmolds can have a generally U-shaped frame 150 with square corners 152. The frame can provide a light transmissive window 154 and can be integrally connected to upright curved sides 156 and 157. A T-shaped support section 158 can extend and be integrally connected to the lower portions of the upright curved sides.

Backlighting 160 (FIGS. 2, 3 and 5) can be positioned below the keys. The backlighting can comprise a light guide comprising an elongated backlighting strip (sheet) 162 that can extend laterally across the mobile unit below the keypad. The backlighting can be powered by the battery for backlighting and illuminating the intermediate keys and the side keys. In the illustrative embodiment, the backlighting is spaced laterally inwardly from the longitudinal edges.

Conductive flexes 162 (FIGS. 3 and 5) can extend laterally and at a position and location below the backlighting strip. The conductive flexes can include an elongated intermediate conductive flex 164 for abuttingly engaging the backlighting strip and side conductive flexes 166 and 167 positioned at a level below the intermediate conductive flex. The intermediate conductive flex are preferably longer that the sides flexes.

Tactile finger-depressible domed contact switches 168 (FIG. 3) providing domes 170 can be positioned within an interior of the mobile unit. The doomed contact switches can include tactile side domed contact switches 172 and tactile intermediate domed switches 174. The side doomed contact switches can be positioned below and securely covered by the side conductive flexes. The side domed contact switches can be spaced laterally inwardly from the longitudinal edges. The intermediate domed switches can be positioned below and securely covered by the intermediate conductive flex. The intermediate domed switches and intermediate conductive flex can be positioned at an intermediate first distance (first depth) 176 to an intermediate first level 178 below the intermediate keys. The side domed contact switches and the side flexes can be positioned at a second distance (second depth) 180 to a second level 182 below the side keys. In the illustrated embodiment, the second distance of the side domed contact switches is substantially greater than the intermediate first distance to the intermediate first level of the intermediate domed contact switches.

An elongated printed circuit board (PCB) 184 (FIGS. 2, 3 and 5) can extend laterally and having opposite PCB surfaces 186 and 187 including an upper front PCB surface 186 and a lower back PCB surface 187. The upper PCB surface can support and engage the intermediate flex and the intermediate domed contact switches. The lower PCB surface can be positioned at a level above the second level of the side domed contact switches and the side flexes. Upright posts 188 providing support columns can extend substantially vertically between and abuttingly engage the lower PCB surface and the battery floor to support and raise the elongated PCB above the battery floor.

Advantageously, the side keys cooperate with the housing to provide a waterproof casing (case) 190 (FIG. 1) and sealing system 192 to seal and protect the tactile finger-engageable keys, backlighting, flexes, domed contact switches, and elongated PCB from water.

Figure 3:
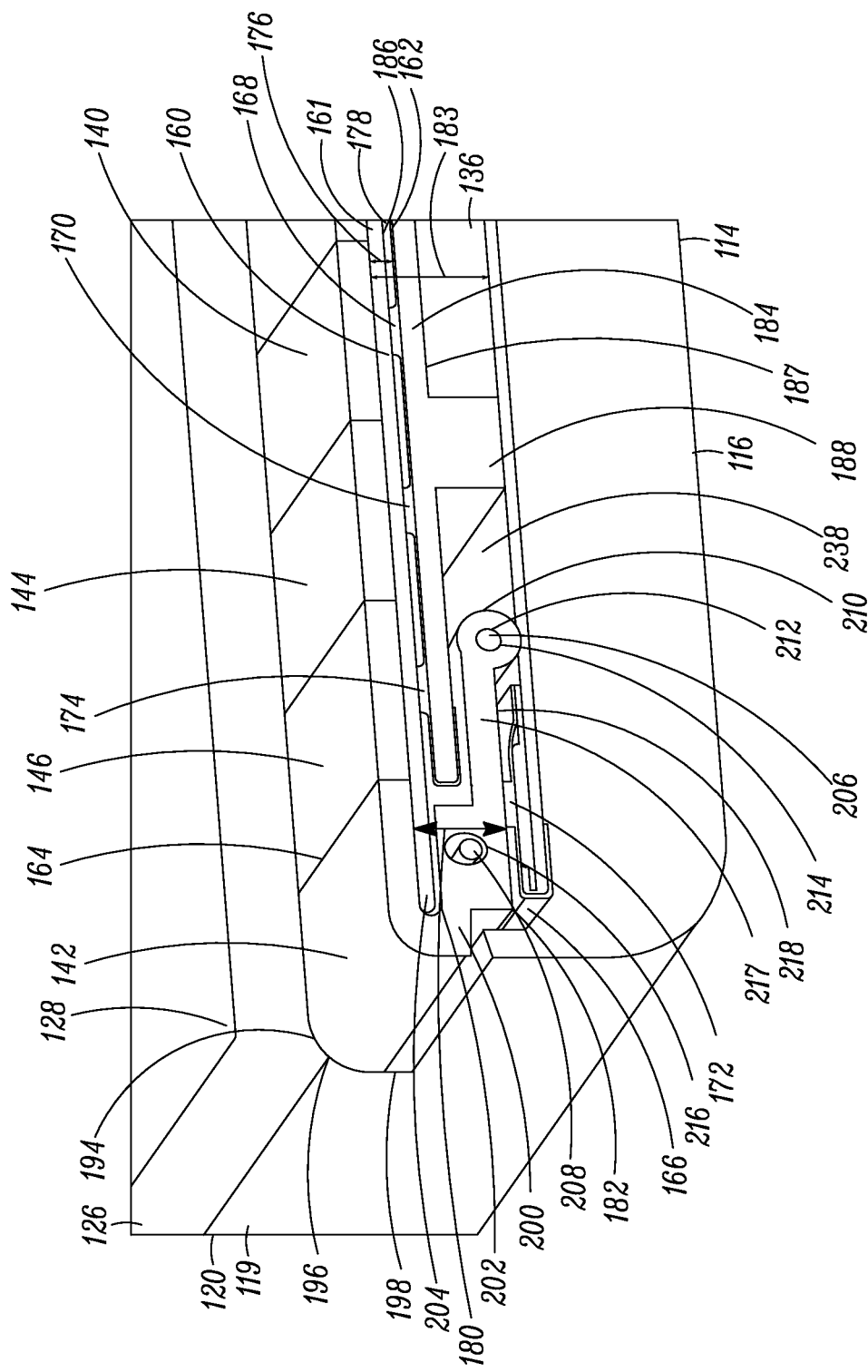
FIG. 3 is an enlarged fragmentary perspective view similar to FIG. 2, but also illustrating a side key (edge key), side flex and side dome.
Figure 5:
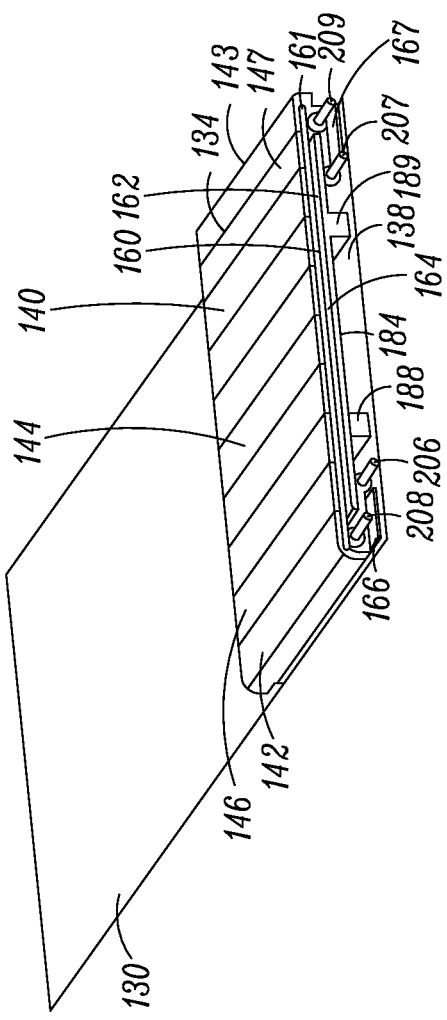
FIG. 5 is a top perspective view of the qwerty keyboard, backlight, flexes, PCB, post and battery/display floor.

As shown in FIG. 3, the side keys can comprise overhanging pivotable edge keys 194 providing wrap keys 196 with overhanging edge portions 198 which overhang, wrap or curl about at least a portion of the longitudinal edges of the longitudinal sides. The side keys can have intermediate portions 200 which are positioned below and cooperate with the overhanging portions to provide backlighting strip-receiving channels 202 that defining laterally extending slots for receiving the longitudinal end portions 204 of the backlighting strip. Pivot pins 206 and 207 (FIGS. 3 and 5) can be positioned below the intermediate keys adjacent the side keys. Retention pins 208 and 209 can be positioned below the side keys. Rounded pivotable portions 210 (FIG. 3) can extend laterally from and be integrally connected to the intermediate portions. The rounded pivotable portions are positioned about the pivot pins and having convex curved, battery floor-engaging surfaces 212 which extend at a level below the intermediate portions 200 for abuttingly and pivotably engaging and being supported by the battery floor. The rounded pivotable portions can have central openings which provide and define pivot pin holes 214 to receive the pivot pins. The intermediate portions can provide and define intermediate openings providing retention pin holes 216 to receive the retention pins. The side keys can provide a lever arm 217 with elongated lower facing surfaces 218 which extend laterally from the pivot pin portions to and along the intermediate portions. As shown in FIGS. 3 and 5, the side flexes and side dome contact switches can be positioned and sandwiched between and abuttingly engage the lower facing surfaces of the side keys and the battery floor.

The handheld electronic device and mobile unit can have edge to edge construction, key retention, strength, backlight, key alignment, tactile keypad and domes, water seal and thickness impact resistance.

Figure 6:
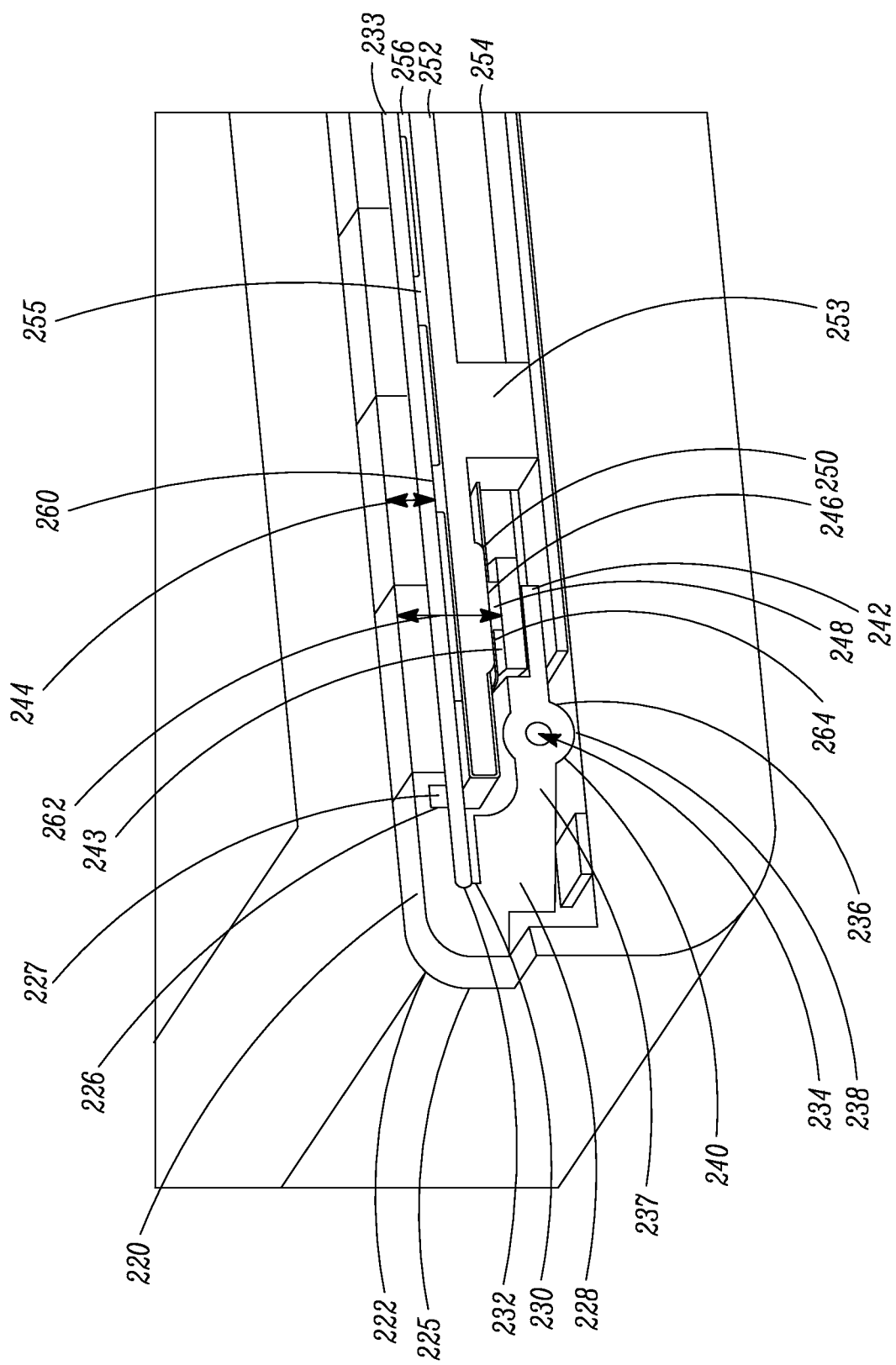
FIG. 6 is an enlarged fragmentary perspective view similar to FIG. 2, but further illustrating a different side key (edge key), side flex and side dome in accordance with the principles of the present invention.

In the embodiment of FIG. 6, the side keys 220 can comprise overhanging pivotable edge keys 222 which provide wrap keys 224 with overhanging edge portions 226 that overhang, wrap or curl about at least a portion of the longitudinal edges of the longitudinal sides. The side keys can have intermediate portions 228 which are positioned below and cooperate with the overhanging portions to provide backlighting strip-receiving channels 230 that defining laterally extending slots for receiving longitudinal end portions 232 of the backlighting strip. Pivot pins 234 can be positioned below the intermediate keys adjacent the side keys. Rounded pivotable portions 236 can extend laterally from and be integrally connected to the intermediate portions via lever arms 237. The rounded pivotable portions are positioned about the pivot pins and having convex curved, battery floor-engaging surfaces 238 which extend at a level below the intermediate portions of the side keys for abuttingly and pivotably engaging and being supported by the battery floor. The rounded pivotable portions can have central openings which provide and define pivot pin holes 240 to receive the pivot pins. Lower elongated cantilevered portions 242 can extend laterally inwardly from the pivotable portions and can have upper side-flex supporting surfaces 244 for engaging and supporting the side flexes 246.

As shown in FIG. 6, the side dome contact switches 248 and side flexes can be positioned and sandwiched between and can abutting engage the upper side-flex supporting surfaces and lower PCB surface 250 of the PCB 252. The intermediate domed switches 254 can be positioned below and securely covered by the intermediate conductive flex 256. The intermediate domed switches and intermediate conductive flex can be positioned at an intermediate first distance (first depth) 258 an intermediate first level 260 below the intermediate keys. The side domed contact switches and the side flexes can be positioned at a second distance (second depth) 262 to a second level 264 below the intermediate keys adjacent the side keys. In the illustrated embodiment, the second distance of the side domed contact switches is substantially greater than the intermediate first distance to the intermediate first level of the intermediate domed contact switches.

The handheld electronic device and mobile unit of the embodiment of FIG. 6 can help simplify the arrangement and assembly of the flexes and PCB and provides a useful waterproof casing (case) 266 and sealing system 268 to help prevent water ingress and to seal and protect the tactile finger-engageable keys, backlighting, flexes, domed contact switches, and elongated PCB from water.

Among the many advantages of the handheld electronic device are:
1. Edge to edge qwerty keypad
2. Maximizes the size of the keypad.
3. More useable for numerous phone form factors.
4. Provides an excellent water sealing keypad system with a unique sealing design for the keypad, keys and components of the handheld electronic device.
5. Minimizes the problem of water sealing the keys of a keypad in a mobile phone or other electronic device in an inexpensive manner.
6. The improved water sealing qwerty keypad system can be used with any electronic device that requires a higher level of water ingress protection.
7. Prevent the keys from being picked off.
8. Minimize the thickness impact of the handheld electronic device.
9. The lever arm of the outer side key allows backlight construction.
10. Similar tactile and good alignment of the outer side keys to the main keypad.
11. Waterproof design.
12. Superior capability.
13. Superb performance.
14. Enhanced operation.
15. Excellent sealing and waterproofing of sides keys.
16. Outstanding ability to function with exterior moisture.
17. Better tactile feeling and touch control.
18. Comfortable.
19. Reliable.
20. User friendly.
21. Easy to operate.
22. Durable.
23. Economical.
24. Attractive.
25. Efficient.

Although embodiments of the invention have been shown and described, it is to be understood that various modifications, substitutions, and rearrangements of parts, components, and/or process (method) steps, as well as other uses of the handheld electronic device can be made by those skilled in the art without departing from the novel spirit and scope of this invention.

What is claimed is:

1. A handheld electronic device, comprising:
a mobile unit having a housing with sides and opposed surfaces, said sides including longitudinal sides with longitudinal edges and lateral sides with lateral edges;
said mobile unit having a battery compartment for receiving a battery;
one of said surfaces having a keypad;
said keypad extending to two of said sides and having at least 10 keys including side keys and intermediate keys positioned between said side keys;
said side keys extending to and substantially aligned with two of said sides;
backlighting positioned below said keys, said backlighting comprising an elongated backlighting strip extending laterally and powered by the battery for backlighting and illuminating said intermediate keys and said side keys, said backlighting being spaced laterally inwardly from said longitudinal edges;
conductive flexes extending laterally and positioned below said elongated backlighting strip, said conductive flexes including an elongated intermediate conductive flex for abuttingly engaging said backlight strip and side conductive flexes positioned at a level below said intermediate conductive flex, and said intermediate conductive flex being longer that said sides flexes;
a printed circuit board (PCB) extending laterally and having opposite PCB surfaces including a an upper front PCB surface and a lower back PCB surface, said upper PCB surface supporting and engaging said intermediate, and said lower PCB surface positioned at a level above said side flexes; and at least one upright post extending substantially vertically between and abuttingly engaging said lower PCB surface and said battery floor for supporting and raising said elongated PCB above said battery floor.

2. A handheld electronic device in accordance with claim 1 wherein said keypad is selected from the group consisting of a qwerty keypad and a qwerty keyboard.

3. A handheld electronic device in accordance with claim 1 wherein said side keys comprise wrap keys which wrap or curl about at least a portion of said sides.

4. A handheld electronic device in accordance with claim 1 wherein:
said longitudinal sides are longer than said lateral sides;
said keypad extends to said longitudinal sides; and
said side keys extend to and abuttingly engage said longitudinal edges.

5. A handheld electronic device in accordance with claim 1 wherein:
said mobile unit comprises a display positioned in proximity to said keypad;
said mobile unit is generally rectangular and moveable from a portrait mode to a landscape mode and vice versa;
said keypad is spaced longitudinally from said display; and
said keys are positioned for use in the portrait mode.

6. A handheld electronic device in accordance with claim 1 comprising:
domed contact switches including side domed contact switches positioned inwardly of said side keys and intermediate domed contact switches positioned inwardly of said intermediate keys; and
said side domed contact switches are positioned at a level farther inward from said side keys than said intermediate domed contact switches are from said intermediate keys.

7. A handheld electronic device in accordance with claim 6 wherein said conductive flexes are positioned adjacent said domed contact switches.

8. A handheld electronic device in accordance with claim 6 comprising:
said intermediate domed contact switches are positioned in front of said front PCB surface; and
said side domed contact switches are positioned in back of said back PCB surface.

9. A handheld electronic device in accordance with claim 1 wherein said side keys comprise pivotable side keys.

10. A handheld electronic device, comprising:
a mobile unit having a housing with sides and outer and inner surfaces, said sides including longitudinal sides with longitudinal edges and lateral sides with lateral edges, said longitudinal sides being longer than said lateral sides;
said mobile unit having a battery compartment for receiving a battery; said mobile unit being moveable from a portrait mode to a landscape mode and vice versa;
one of said surfaces having a keypad and a display positioned in proximity to said keypad;
said keypad extending to said longitudinal sides and having at least 10 keys including side keys and intermediate keys positioned between said side keys;
said sides keys extending to and substantially aligned with said longitudinal edges;
backlighting positioned below said keys, said backlighting comprising an elongated backlighting strip extending laterally and powered by the battery for backlighting and illuminating said intermediate keys and said side keys, said backlighting being spaced laterally inwardly from said longitudinal edges;
conductive flexes extending laterally and positioned below said elongated backlighting strip, said conductive flexes including an elongated intermediate conductive flex for abuttingly engaging said backlight strip and side conductive flexes positioned at a level below said intermediate conductive flex, and said intermediate conductive flex being longer that said sides flexes;
domed contact switches providing domes within an interior of said mobile unit, said domed contact switches including side domed contact switches and intermediate domed contact switches, said side domed contact switches being spaced laterally inwardly from said longitudinal edges, said intermediate domed contact switches being positioned at an intermediate level transversely from said intermediate keys, said side domed contact switches being positioned to a farther level transversely from said side keys or transversely from said intermediate keys adjacent said side keys, and said farther level of said side domed contact switches have a greater span to said keys than the intermediate level of said intermediate domed contact switches to said intermediate keys; and
a printed circuit board (PCB) extending laterally and having opposite PCB surfaces including a an upper front PCB surface and a lower hack PCB surface, said upper PCB surface supporting and engaging said intermediate flex and said intermediate domed contact switches, and said lower PCB surface positioned at a level above said second level of said side domed contact switches and said side flexes; and
at least one upright post extending substantially vertically between and abuttingly engaging said lower PCB surface and said battery floor for supporting and raising said elongated PCB above said battery floor.

11. A handheld electronic device in accordance with claim 10 wherein:
said mobile unit includes a module with a keypad-containing portion for said keypad;
said module being selected from the group consisting of a base, flip, slide, and moveable portion; and
said keypad being selected from the group consisting of a qwerty keypad, tactile keypad, light transmissive keypad, qwerty keyboard, capacitive keypad, keyboard, alpha numeric keypad, mold print keypad, and combinations of any of the preceding.

12. A handheld electronic device in accordance with claim 10 wherein:
said hand held electronic device comprises a mobile electronic communications device selected from the group consisting of: a radiotelephone, a cellular (cell) phone, a mobile phone, smart phone, flip phone, slider phone, android phone, tablet phone, camera phone, clamshell device, portable networking device, qwerty device, wireless device, personal digital assistant (PDA), wireless e-mail device, a two way pager, internet communications device, android tablet, ipod, ipad, blackberry, tablet device, and combinations of any of the preceding;
said keys comprise keys selected from the group consisting of light transmissive keys, backlit keys, tactile keys, alpha numeric keys, shift key, command key, enter key, space key, delete key, return key, capital letter key, tab key, buttons, and combinations of any of the preceding; and said display is selected from the group consisting of a display screen, touchscreen, display with touch sensors, touchpad, capacitive touchpad, user interface, screen with zoom control, screen with a magnifier, screen with a scroll bar, screen with a slide bar, screen providing a browser window, screen with an electronic mouse, screen with a visual selector, screen with a moveable cursor, a screen with a pointer, and combinations of any of the preceding.

13. A handheld electronic device in accordance with claim 10 wherein:
said side keys are selected from the group consisting of overhanging edge keys which overhang, wrap or curl about at least a portion of one of said longitudinal edges of said longitudinal sides, pivotable side keys, a side key with a retention pin, a side key with a pivot pin, a side key having a channel defining a slot for receiving an end portion of said backlighting strip, and a side key positioned on the battery floor of the battery compartment, and combinations of any of the preceding; and
said side domed contact switches are positioned at a location selected from the group consisting of a side position transversely aligned with said side keys and an intermediate position transversely aligned with intermediate keys adjacent said side keys.

14. A handheld electronic device in accordance with claim 10 comprising:
said intermediate domed contact switches are positioned in front of said front PCB surface; and
said side domed contact switches are positioned in back of said back PCB surface.

15. A handheld electronic device in accordance with claim 10 wherein said side keys cooperate with said housing to provide a waterproof casing and sealing system to seal and protect said keys and domed contact switches from water.

16. A handheld electronic device, comprising:
a mobile electronic communications device providing a generally rectangular mobile unit having a housing with generally rectangular sides, an outer upper surface providing a top of the mobile unit and an inner bottom surface providing a bottom of said mobile unit, said generally rectangular sides including substantially parallel longitudinal sides with longitudinal edges and substantially parallel lateral sides with lateral edges, said longitudinal sides having similar lengths and being longer than said lateral sides, and said longitudinal edges being longer than said lateral edges;
said mobile unit having a battery compartment for receiving a battery, said battery compartment having a battery floor and said mobile unit being moveable from a portrait mode to a landscape mode and vice versa;
an edge to edge qwerty keypad on one of said surfaces;
a generally rectangular display positioned in proximity to and spaced longitudinally from said edge to edge qwerty keypad;
said edge to edge qwerty keypad extending to said longitudinal edges of said longitudinal sides and having tactile finger-engageable keys that are actuated and depressed with an actuation force, said tactile finger-engageable keys including side keys and intermediate keys positioned laterally between said side keys, said side keys being actuated and depressed by a side key-actuation force, said intermediate keys being actuated and depressed by an intermediate key-actuation force, said side key-actuation force and said intermediate key-actuation force being substantially similar, said sides keys extending to and being substantially vertically aligned with said longitudinal edges of said longitudinal sides;
backlighting positioned below said tactile finger-engageable keys, said backlighting comprising an elongated backlighting strip extending laterally and powered by the battery for backlighting and illuminating said intermediate keys and said side keys, said backlighting being spaced laterally inwardly from said longitudinal edges;
conductive flexes extending laterally and positioned below said elongated backlighting strip, said conductive flexes including an elongated intermediate conductive flex for abuttingly engaging said backlight strip and side conductive flexes positioned at a level below said intermediate conductive flex, and said intermediate conductive flex being longer that said sides flexes;
tactile finger-depressible domed contact switches providing domes positioned within an interior of said mobile unit, said doomed contact switches including tactile side domed contact switches and tactile intermediate domed switches, said side doomed contact switches being positioned below and securely covered by said side conductive flexes, said tactile side domed contact switches being spaced laterally inwardly from said longitudinal edges, and said tactile intermediate domed switches being positioned below and securely covered by said elongated intermediate conductive flex;
said tactile intermediate domed switches and said elongated intermediate conductive flex being positioned at an intermediate first distance to an intermediate first level below said intermediate keys, said tactile side domed contact switches and said side flexes being positioned at a second distance to a second level below said side keys or said intermediate keys adjacent said side keys, and said second distance of said side domed contact switches being substantially greater than said intermediate first distance to the intermediate first level of said intermediate domed contact switches;
an elongated printed circuit board (PCB) extending laterally and having opposite PCB surfaces including a an upper front PCB surface and a lower back PCB surface, said upper PCB surface supporting and engaging said intermediate flex and said intermediate domed contact switches, and said lower PCB surface positioned at a level above said second level of said side domed contact switches and said side flexes;
at least one upright post extending substantially vertically between and abuttingly engaging said lower PCB surface and said battery floor for supporting and raising said elongated PCB above said battery floor; and
said side keys cooperating with said housing to provide a waterproof casing and sealing system to seal and protect said tactile finger-engageable keys, backlighting, flexes, domed contact switches, and elongated PCB from water.

17. A handheld electronic device in accordance with claim 16 wherein:
said mobile electronic communications device is selected from the group consisting of: a radiotelephone, a cellular (cell) phone, a mobile phone, smart phone, flip phone, slider phone, android phone, tablet phone, camera phone, clamshell device, portable networking device, qwerty device, wireless device, personal digital assistant (PDA), wireless e-mail device, a two way pager, internet communications device, android tablet, ipod, ipad, blackberry, tablet device, and combinations of any of the preceding;

said tactile finger-engageable keys comprise qwerty keys selected from the group consisting of light transmissive keys, backlit keys, tactile keys, alpha numeric keys, shift key, command key, enter key, space key, delete key, return key, capital letter key, tab key, buttons, and combinations of any of the preceding; and said display is selected from the group consisting of a display screen, touchscreen, display with touch sensors, touchpad, capacitive touchpad, user interface, a screen with zoom control, a screen with a magnifier, a screen with a scroll bar, a screen with a slide bar, a screen providing a browser window, a screen with an electronic mouse, a screen with a visual selector, a screen with a moveable cursor, a screen with a pointer, and combinations of any of the preceding.

18. A handheld electronic device in accordance with claim 16 wherein;

said side keys comprise overhanging pivotable edge keys providing wrap keys, said overhanging pivotable edge keys comprising overhanging edge portions which overhang, wrap or curl about at least a portion of said longitudinal edges of said longitudinal sides;

intermediate portions positioned below and cooperating with said overhanging portions for providing backlighting strip-receiving channels defining laterally extending slots for receiving end portions of said backlighting strip;

pivot pins positioned below said intermediate keys adjacent said side keys; and rounded pivotable portions extending laterally from and integrally connected to said intermediate portions, said rounded pivotable portions positioned about said pivot pins and having a convex curved, battery floor-engaging surfaces extending at a level below said intermediate portions for abuttingly and pivotably engaging and being supported by said battery floor, and said rounded pivotable portions have central openings defining pivot pin holes for receiving said pivot pins.

19. A handheld electronic device in accordance with claim 18 wherein:

said overhanging pivotable edge keys comprises
retention pins;

said intermediate portions defining intermediate openings providing retention pin holes for receiving said retention pins; and elongated lower facing surfaces extending laterally from said pivot pin portions to and along said intermediate portions; and said side flexes and side dome contact switches are positioned and sandwiched between and abuttingly engage said lower facing surfaces and said battery floor.

20. A handheld electronic device in accordance with claim 18 wherein:

said overhanging pivotable edge keys comprises elongated cantilevered portions extending laterally inwardly from said pivotable portions, said elongated cantilevered portions having upper side-flex supporting surfaces for engaging and supporting said side flexes; and said side dome contact switches and side flexes being positioned and sandwiched between and abutting engaging said upper side-flex supporting surfaces and said lower PCB surface.

* * * * *

UNITED STATES PATENT AND TRADEMARK OFFICE
CERTIFICATE OF CORRECTION

PATENT NO. : 8,760,406 B2
APPLICATION NO. : 13/437957
DATED : June 24, 2014
INVENTOR(S) : Herrmann et al.

Page 1 of 1

It is certified that error appears in the above-identified patent and that said Letters Patent is hereby corrected as shown below:

In the Claims

Column 8, line 64, claim 1, delete "that" and insert -- than --, therefor.

Column 8, line 66, claim 1, delete "a an" and insert -- an --, therefor.

Column 10, line 10, claim 10, delete "that" and insert -- than --, therefor.

Column 10, line 28, claim 10, delete "a an" and insert -- an --, therefor.

Column 10, line 29, claim 10, delete "hack" and insert -- back --, therefor.

Column 12, line 17, claim 16, delete "that" and insert -- than --, therefor.

Column 12, line 41, claim 16, delete "a an" and insert -- an --, therefor.

Signed and Sealed this
Second Day of September, 2014

Michelle K. Lee
*Deputy Director of the United States Patent and Trademark Office*